DEVICE COMPRISING AN AMPLIFIER, A PHOTOELECTRIC CELL, AND A LEAD CONNECTING IT

Filed Feb. 8, 1947

P. F. VAN ELDIK & H. N. HANSEN
INVENTORS
BY [signature]
AGENT

Patented Feb. 19, 1952 2,586,582

UNITED STATES PATENT OFFICE 2,586,582

DEVICE COMPRISING AN AMPLIFIER, A PHOTOELECTRIC CELL, AND A LEAD CONNECTING THEM

Pieter Frederik van Eldik and Hendrik Nicolaas Hansen, Eindhoven, Netherlands, assignors to Hartford National Bank and Trust Company, Hartford, Conn., as trustee Application February 8, 1947, Serial No. 727,420
In the Netherlands June 14, 1944

Section 1, Public Law 690, August 8, 1946
Patent expires June 14, 1964

2 Claims. (Cl. 250—214)

Figures 1, 2:
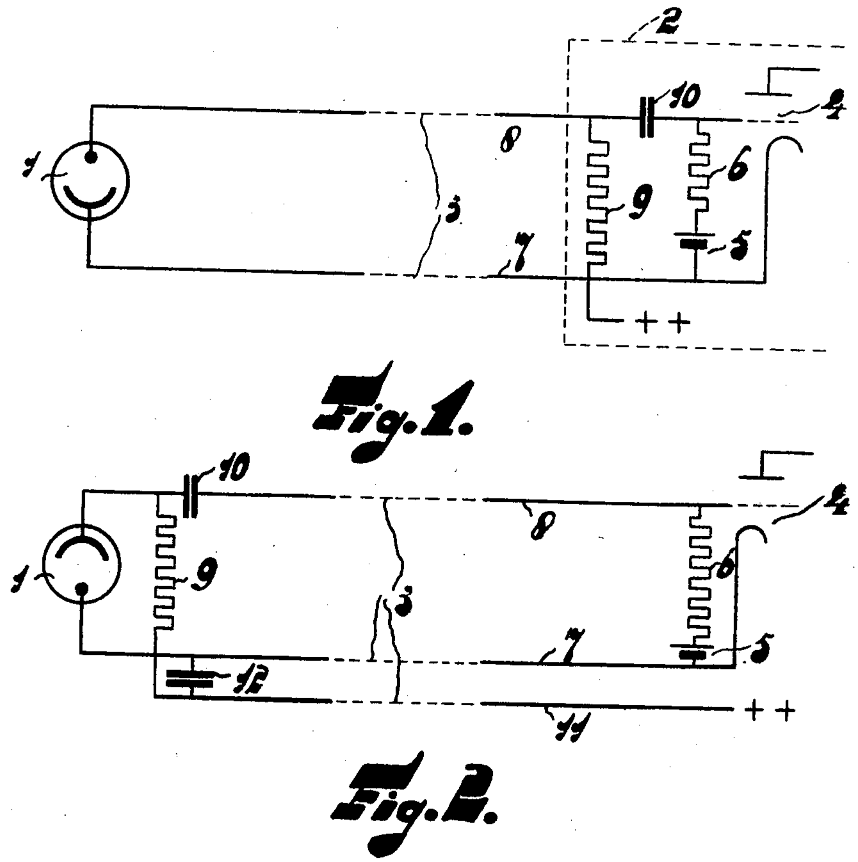

In photo-electric cell amplifiers it is customary to supply the direct voltage, which is required for the photo-cell, to the latter through the same lead through which the photoelectrically generated alternating voltage is carried off to the amplifier. In order to block the grid of first amplifying tube in regard to the comparatively high feed voltage, the grid circuit includes a condenser.

This common device has a drawback which will be explained with reference to Fig. 1 which represents its wiring diagram.

The device consists of photo-cell 1 and an amplifier 2 which are connected to two conductors through a lead 3. The amplifier comprises, for instance, an amplifying tube 4 with a grid voltage supply 5 and a grid-leakage resistance 6. Through the conductors 7 and 8 of the lead 3 pass both the direct current which is required for the operation of the photo-cell and supplied to the conductor 8 through a resistance 9, and the alternating current produced in the cell, which is supplied through a condenser 10 to the grid of the amplifying tube.

In this common device the capacity constituted by the two conductors of the lead 3 is charged up to a voltage corresponding to the feed voltage of the cell. This results in that any variation of the capacity of the lead, which occurs if mechanical forces, for instance impact, are exerted on the lead, involves a charge variation of the lead with a concomitant compensation current which produces a disturbing voltage in the input circuit of the amplifier. The aforesaid capacity variations cannot be avoided, or at least only with great difficulty, by a special construction of the lead.

This evil is cured in the device according to the invention. According thereto one of the two conductors, through which the photoelectrically produced alternating current may be carried off from the cell to the amplifier, includes a condenser in the proximity of the photo-cell, the direct voltage required for feeding the photo-cell being supplied through the other of the said two conductors and a third conductor. The two conductors, through which the direct current is supplied to the cell, may include a filter damping the alternating currents produced in the photocell.

In order that the invention may be clearly understood and readily carried into effect it will now be described more fully with reference to the accompanying drawing, in which Fig. 2 represents, by way of example, the circuit arrangement of one embodiment thereof. In this figure, parts corresponding to those shown in Fig. 1 bear the same reference numerals.

In the present case the lead 3 comprises three conductors 7, 8 and 11. Through the conductors 7 and 11 the feed current is supplied to the photocell. The conductors 7 and 8, by which the alternating current produced in the photo-cell, is supplied to the amplifier, are blocked in regard to direct current by a condenser 10 which may have a value of about 0.1 $\mu$F. It is obvious that in this device any capacity variations between the conductors 7 and 8 will practically not affect the amplifier, since only a very low voltage may be set up between these conductors and, on the occurrence of capacity variations due to impact, practically no charge variations occur. Any alternating voltages set up in the conductor 11, which may be initiated by capacity variations between the conductors 7 and 11, are blocked by the series-resistance 9, which may amount to about 50,000 ohms, and are carried off through a condenser 12 of about 0.5 $\mu$F.

What we claim is:

1. A photoelectric circuit arrangement, comprising an amplifier having a first pair of input terminals, a light sensitive cell having a second pair of terminals remotely located from said first pair of terminals, a source of direct current potential, a lead system comprising three conductors, a pair of said conductors of said lead system intercoupling said first pair of terminals and said second pair of terminals, and the third of said conductors and one of the conductors of said pair intercoupling said second pair of terminals and said source of direct current potential, and a capacitive element being positioned in the other of the conductors of said pair adjacent to said cell.

2. A photoelectric circuit arrangement, comprising an amplifier having a first pair of input terminals, a light sensitive cell having a second pair of terminals remotely located from said first pair of terminals, a source of direct current potential, a lead system comprising three conductors, a pair of said conductors of said lead system intercoupling said first pair of terminals and said second pair of terminals, and the third of said conductors and one of the conductors of said pair intercoupling said second pair of terminals and said source of direct current potential, alternating current filter means intercoupling the third of said conductors and said one of the conductors of said pair, and a capacitive element being positioned in the other of the conductors of said pair adjacent to said cell.

PIETER FREDERIK VAN ELDIK.
HENDRIK NICOLAAS HANSEN.

REFERENCES CITED

The following references are of record in the file of this patent:

UNITED STATES PATENTS

| Number | Name | Date |
|---|---|---|
| 1,631,021 | Dowling | May 31, 1927 |
| 1,884,376 | Tedham | Oct. 25, 1932 |
| 1,911,382 | Nelson | May 30, 1933 |
| 1,931,829 | Poulsen et al. | Oct. 24, 1933 |
| 2,424,933 | Kalmus | July 29, 1947 |

FOREIGN PATENTS

| Number | Country | Date |
|---|---|---|
| 335,639 | Great Britain | Oct. 2, 1930 |